(12) United States Patent
Dreihofer et al.

(10) Patent No.: US 6,500,552 B1
(45) Date of Patent: Dec. 31, 2002

(54) COATING IN PARTICULAR FOR TONER DRUMS, AND METHOD FOR PRODUCING THE SAME

(75) Inventors: Sabine Dreihofer, Warstein (DE); Gert Neumann, Berlin (DE); Alexandra Geiss, SeBlach (DE); Klaus Rose, Kitzingen (DE)

(73) Assignee: AEG Elektrofotografie GmbH, Warstein (DE)

( * ) Notice: Subject to any disclaimer, the term of this patent is extended or adjusted under 35 U.S.C. 154(b) by 65 days.

(21) Appl. No.: 09/654,645

(22) Filed: Sep. 5, 2000

(30) Foreign Application Priority Data

Sep. 6, 1999 (DE) .......................................... 199 42 423

(51) Int. Cl.⁷ ................................................ B32B 9/04
(52) U.S. Cl. ...................... 428/446; 427/58; 427/385.5; 427/387; 427/407.1; 427/489; 427/496; 427/503; 427/508; 427/515; 427/532; 427/535; 427/551; 427/553; 427/554; 427/557; 427/558; 427/559; 427/595; 427/596
(58) Field of Search ................................ 427/489, 496, 427/503, 508, 515, 532, 535, 551, 553, 554, 557, 558, 559, 595, 596, 58, 407.1, 387, 385.5; 428/446

(56) References Cited

U.S. PATENT DOCUMENTS 4,407,920 A  10/1983  Lee et al. ..................... 430/59

FOREIGN PATENT DOCUMENTS

| EP | 0300426 | 1/1989 | ............ G03G/5/14 |
| EP | 0450625 | 10/1991 | ............ B05D/3/00 |

*Primary Examiner*—Bernard Pianalto
(74) *Attorney, Agent, or Firm*—Hoffman, Wasson Gitler, PC

(57) ABSTRACT

The present invention relates to an electrically conductive coating that is producible by hydrolytic condensation of a mixture comprising at least one silicon compound of the general formula $SiX_nR_{(4-n)}$ (I), wherein at least one of the groups R is a mercapto-substituted alkyl or aryl group; and a compound of the general formula $Z_aSiY_bR_{(a-4-b)}$ (II), wherein the group Z is a quaternary ammonium salt, for example. Said coating is particularly suitable for toner transfer drums, and exhibits high scratch resistance and good adhesion to the substrate.

24 Claims, No Drawings

COATING IN PARTICULAR FOR TONER DRUMS, AND METHOD FOR PRODUCING THE SAME

CLAIM OF PRIORITY

This application claims foreign priority from German application no. 199 42 423.3 filed Sep. 6, 1999 having the same title as indicated above.

BACKGROUND OF THE INVENTION

1. Field of the Invention

The present invention relates to a coating, in particular for toner transfer drums, that is producible by hydrolytic condensation of a mixture comprising at least one hydrolyzable silicon compound of the general formula $$SiX_nR_{(4-n)} \qquad (I).$$

2. The Prior Art

EP 0 450 625 B1 describes a coating of the aforementioned art and a method for coating a plastic substrate with such a coating. It is proposed there to produce a particularly scratch-resistant coating, proceeding from silane hydrolysate lacquers based on vinyl mercapto addition, that is rapidly curable under UV radiation. Such a coating for use as a layer on a toner transfer drum, however, is suitable only if said layer, in addition to abrasion resistance (scratch resistance), also has the requisite electrical conductivity. This is not provided in the known coating from the cited document.

Toner transfer drums for laser printers, copiers, and fax machines are especially favorably produced in various dimensions and unit quantities by using organic photoconductors, whereby, by the incorporation of photosensitive pigments in specially purified polymers in the form of a so-called generator layer on an aluminum support and a transport layer thereon that is composed of a polymer doped with said photoconductor, the electrophotographic function is achieved. Generator layers as well as transport layers (also known as OPC layers) are relatively soft and have only slight scratch resistance, whereby said OPC layer is even considerably softer than unmodified polycarbonate, for example. Although a number of different technical solutions have claimed to create improved abrasion resistance of such systems, no long-term abrasion-resistant coatings have been achieved at present in a marketable product. Of the currently existing proposals for improving the hardness and abrasion resistance of such systems for this technical use, only the most significant of these will be discussed here.

It is hereby apparent that a combination of high abrasion resistance with the required conductivity has heretofore been associated with a reduction of one of said properties. For example, Patent DE 30 32 773 (Hoechst) describes an image carrier having a hard, crosslinked surface layer, which however exhibits too high a surface resistance. An image carrier having a surface layer based on metal alkoxide and alkyl/aryltrialkoxysilane, described in Patent DE 40 10 328 (Fuji Xerox), has the same properties, whereby it becomes clear that, based on their extraordinarly dense network structure, silane hydrolysate lacquers or those hybrid polymers formed partially from inorganic consitituents are particularly significant for the coating of image carriers or toner transfer drums.

Both U.S. Pat. No. 4,923,775 and U.S. Pat. No. 5,116,703 (both Xerox) describe image carriers having surface layers based on crosslinked polysiloxanes which, by the incorporation of photoconductors, claim to achieve the electrophotographic properties, whereby in U.S. Pat. No. 5,116,703, the layer is also organically crosslinked. Here, on the basis of the high photoconductor content, the surface resistance is markedly lower than for an unmodified silane hydrolysate lacquer. U.S. Pat. No. 4,595,602 (Xerox) also describes surface layers based on crosslinked polysiloxane that claim to impart abrasion-inhibiting properties by means of thermal crosslinking of linear siloxanes with silicic acid.

A further improvable property of the known coating materials is the curing regime of same. Curing is generally carried out by thermal means. For toner transfer drums, said thermal curing is possible only below 100° C. due to the high expansion coefficients of the generator layer.

The object of the present invention is to provide, after curing at low temperatures, an electrically conductive lacquer, in particular for the coating of toner transfer drums, whereby the resulting coating has high scratch resistance and good adhesion to the substrate.

The solution of this object provides an electrically conductive coating, in particular for toner transfer drums, having the features of claim 1. The features cited in Subclaims 2 through 10 concern preferred developments of the solution according to the invention. Preferred variants of the coating according to the invention are described in said subclaims.

The invention further relates to a method for producing an electrically conductive coating, preferably on a toner transfer drum, having the features of claim 11. Subclaims 12 through 17 concern preferred variants of the coating production method described in claim 11.

The invention further relates to a method for producing an electrically conductive coating on a toner transfer drum, having the features of claim 18.

A further requirement of the coating according to the invention is that said coating should be satisfactorily curable in the shortest possible time at relatively low temperatures. In addition, the conductive coating material should have sufficient storage stability. Furthermore, considerable insensitivity to tropical climates (high humidity) should be present, in particular to assure unlimited use of the toner transfer drums provided with a coating according to the invention, and of devices equipped with said toner transfer drums, such as copiers, printers, and the like.

Within the scope of the invention, the following embodiments concern particularly suited preferred variants of the coating, the properties of said coating, and preferred methods for production of such a coating according to the invention.

SUMMARY OF THE INVENTION

A preferred solution consists in the use of vinyl mercapto addition to produce an abrasion-resistant overlayer by UV curing of a suitable lacquer, and incorporation of an electrolytically active compound, for example a quaternary ammonium salt, to divert charge to the exposed sites. Surprisingly, the interaction of such electrolytically active compounds with said incorporated mercapto groups achieves a particularly high conductivity of the material, whereby only small quantities of said quaternary ammonium compounds are required. A particular advantage of the solution according to the invention lies in the option for catalyst-free production of said vinyl mercapto lacquer by use of quaternary ammonium compounds.

Achievement of a three-layer construction allows the technically advantageous production of an image carrier, whereby high productivity is achieved by UV curing. Creation of a higly crosslinked surface layer results in exceptional resistance of said image carrier in the long-term pressure test, whereby an adjusted surface resistance assures the function of said image carrier.

SUMMARY OF THE INVENTION

The lacquer according to the invention for coating of a plastic substrate is produced by hydrolytic condensation of a plurality of silicon compounds and, optionally, one or several hydrolyzable compounds of zirconium and/or aluminum in a maximum quantity of 30 mol % relative to the total quantity of silicon and zirconium/aluminum compounds, whereby 1 to 40 mol % of all groups bound to the aforementioned elements are non-hydrolyzable groups having an ethylenically unsaturated bond, and in addition said non-hydrolyzable groups bound to said aforementioned elements, having a mercapto group, are present in such quantities that the ratio of ethylenically unsaturated bonds to mercapto groups in or on non-hydrolyzable groups is 25:1 to 1:1; said lacquer is optionally cured by radiation in the absence of a photoinitiator; and/or thermal curing of the overlayer is carried out. A significant feature of the solution according to the invention is the option for separate hydrolysis of the hydrolyzable silicon compounds, so that organic crosslinking, proceeding according to the invention without additional catalyst, cannot initially take place during separate storage of the components.

For the lacquer according to the invention, particularly suited hydrolyzable silicon compounds are those of the general formula

$$SiX_nR_{(4-n)} \qquad (I)$$

wherein the groups X, which can be the same or different, in particular comprise alkoxy groups such as methoxy, ethoxy, n-propoxy, 1-propoxy, and butoxy, and/or hydroxy groups. However, X can also comprise halogen (F, Cl, Br, and I, in particular Cl and Br), aryloxy (phenoxy, for example), and/or acyloxy groups such as acetoxy and propionyloxy, if the resulting hydrolysis products are removed or are tightly bound. The groups R, which can be the same or different, are selected from alkyl groups such as methyl, ethyl, propyl, and butyl; alkenyl groups such as vinyl, 1-propenyl, 2-propenyl, and butenyl; alkynyl groups such as acetylenyl and 2-propynyl; and aryl groups such as phenyl and naphthyl, whereby the aformentioned groups (with the exception of halogen and hydroxy) can optionally have one or several substituents that are inert under the reaction conditions, such as halogen and alkoxy, for example; and n is a whole number from 1 to 4. The aforementioned alkyl groups also include the corresponding cyclic- and aryl-substituted groups, such as cyclohexyl and benzyl, whereas the alkenyl and alkynyl groups can likewise be cyclic, and the named aryl groups should also include alkaryl groups (such as tolyl and xylyl). The mercapto (HS) groups present according to the invention are preferably located on the aforementioned alkyl and aryl groups, especially the alkyl groups.

In addition to the preferred groups X listed above, hydrogen and alkoxy groups containing 5 to 20 carbon atoms, and halogen- and alkoxy-substituted alkoxy groups (such as β-methoxyethoxy) may be listed as additional, likewise suitable groups. Further examples of suitable groups R are straight-chain, branched, cyclic alkyl, alkenyl, and alkynyl groups containing 5 to 20 carbon atoms, such as n-pentyl, n-hexyl, dodecyl, and octadecyl. Since the X groups are cleaved by hydrolysis, and the hydrolysis product must be removed in a suitable manner, R groups are particularly preferred which bear no substituents and which lead to hydrolysis products with low molecular weight, for example lower alcohols such as methanol, ethanol, propanol, and n-, iso-, sec-, and tert-butanol.

Compounds of formula (I) can be used either totally or partially in the form of precondensates, that is, compounds that are created by partial hydrolysis of compounds of formula (I), either alone or in a mixture with other hydrolyzable compounds, as described in more detail below. In the sense of the invention, particularly suited are those precondensates formed by either the mercapto groups or the double bond-containing silanes, and which furthermore form components I or components II, described below, of multicomponent systems. Such oligomers, preferably soluble in the reaction medium, can be straight-chain or cyclic low-molecular weight partial condensates (polyorganosiloxanes) with a condensation rate of approximately 2 to 100, for example, in particular approximately 2 to 6. Among the non-hydrolyzable groups R present according to the invention, containing an ethylenically unsaturated double bond, the aforementioned alkenyl groups containing 2 to 4 carbon atoms (especially vinyl), as well as (meth)acryloxy-substituted alkyl and aryl groups (especially those containing 2 to 4, or 6 to 10 carbon atoms, such as gamma-methacryloxypropyl) and Styryl are particularly preferred. Non-hydrolyzable groups X containing a mercapto group are preferably selected from mercaptoalkyl groups containing 1 to 6 carbon atoms, such as 3-mercaptopropyl, 4-mercaptobutyl, and 6-mercaptohexyl.

The required electrical conductivity is achieved by means of an additive obtained through hydrolytic (partial) condensation of one or several hydrolytically condensable compounds of silicon and, optionally, other elements from the group comprising B, Al, P, Sn, Pb, the transition metals, the lanthanides and actinides, and/or from precondensates derived from the aforementioned compounds. through the action of water or moisture, and optionally in the presence of a catalyst and/or solvent. Combination with one of the UV-cured components is preferably achieved. One or several of the monomeric compounds hereby used are preferably derived from silicon compounds of the general formula (II):

$$Z_aSiY_bR_{(4-a-b)} \qquad (II)$$

wherein the groups and subscripts are the same or different and have the following meanings:

Y=hydrogen, halogen, hydroxy, optionally substituted alkoxy, acyloxy, alkyl carbonyl, alkoxy carbonyl, or NR'$_2$;

Z=quaternary ammonium salts derived from R$^2_2$N—(R$^3$—NR$^2$—)$_k$—R$^3$, or

Z=1/mA$^{mS}$R$^2_2$—N$^r$—R$^3$—, 1/mA$^{mS}$(HO—R$^3$)$_2$—N$^r$—R$^3$—, 1/mA$^{mS}$(R$^2$O)$_2$P$^r$(O)—R$^3$—, 1/mA$^{mS}$(R$^2_2$—N)$_2$C—S$^r$—R$^3$, 3/nK$^{nr}$(OOC$^S$)$_2$—N—R$^3$—N(COO$^S$)—R$^3$—, 1/mA$^{mS}$H$_2$C=C—(R$^2$)—R$^3$N$^r$(R$^2_2$)—R$^3$—, 1/mA$^{mS}$H$_2$C=C(R$^2$)—CO—O—R$^3$N$^r$(R$^2_2$)—R$^3$—;

R=optionally substituted alkyl, alkenyl, aryl, alkylaryl, or arylalkyl;

R$^1$=hydrogen, alkyl, or aryl;

R$^2$=hydrogen, optionally substituted alkyl, alkenyl, aryl, alkylaryl, or arylalkyl;

R$^3$=optionally substituted alkylene, alkenylene, or arylene;

A$^{mS}$=anion with a valence of m;

K$^{nr}$=cation with a valence of n;

a=1, 2, or 3;
b=1, 2, or 3;
a+b=2, 3, or 4; and
k=0, 1, 2, or 3.

Said additives based on monomeric compounds of formula II are tightly incorporated by means of covalent bonds into the inorganic network specified by components I and II. If the groups R and/or Z contain groups obtainable through polymerization or polyaddition, said groups are also placed in the organic network. The sum of percentages of the compounds according to formula II in the dried or cured coating formed from components I and II should be between 5 and 40 mol %.

Integration of electrolytically active substances into the silicic acid (hetero)polycondensate not only achieves the required reduction of volume resistance, but also optimizes the abrasion resistance. The deviation of said volume resistance from that of pure silane hydrolyzate coating is insignificant.

1. Production of the Coating According to the Invention

The coating according to the invention is producible by the customary art and manner associated with this field. If virtually only silicon compounds (that are relatively unreactive in the hydrolysis) are used, in most cases hydrolytic condensation can be carried out such that to the silicon compounds to be hydrolyzed, which are present either as such or dissolved in a suitable solvent, are directly added the stoichiometrically required quantity of water or, optionally, excess of water, at room temperature or with slight cooling (preferably with stirring and, optionally, in the presence of a hydrolysis and condensation catalyst), and the resultant mixture is then stirred for some time (from one to several hours). If reactive compounds of zirconium and/or aluminum are present, it is generally recommended that the water be added in stages. As a rule, hydrolysis is carried out at temperatures between −20° and 130° C., preferably between 0° and 30° C. or the boiling point of the optionally used solvent, regardless of the reactivity of the compounds present. As already indicated, the optimum type and manner of addition of water depends primarily on the reactivity of the starting compounds used. Thus, said dissolved starting compounds can be slowly added dropwise to an excess of water, or water is added in a portion or portions to said optionally dissolved starting compounds. It can also be useful to add the water not as such, but rather to introduce said water into the reaction system by using water-containing organic or inorganic systems. In many cases, introduction of water into the reaction mixture has proven to be particularly suitable using moisture-bearing adsorbents such as molecular sieves, and water-containing organic solvents such as 80% ethanol. Water can also be added via a reaction in which water is formed, for example during ester formation from acid and alcohol.

If a solvent is used, not only the lower aliphatic alcohols (such as ethanol and isopropanol), but also ketones, preferably lower dialkyl ketones such as acetone and methylisobutyl ketone, ethers, preferably lower dialkyl ethers such as diethyl ether and dibutyl ether, TIAF [tetrahydrofuran], amides, esters, particularly acetic ethyl ester, dimethylformamide, and their mixtures are suitable. If only hydrolyzable silicon compounds are used, the use of lower dialkyl ethers as solvent can prove to be particularly advantageous. In particular, the use of said ethers counteracts rapid gelling of the lacquer if said ethers contain a relatively large number of mercapto groups.

The compounds described by formula II according to the invention preferably serve as hydrolysis and condensation catalysts. Proton-cleaving compounds can also be used. Examples of such are organic and inorganic acids such as hydrochloric acid, acetic acid, formic acid, and/or citric acid. The concentration of additional catalysts can be up to 3 moles per liter, for example, is whereby good solubility in water facilitates growth of the catalyst with water after a middle condensation stage is reached.

Separate hydrolysis of silanes containing mercapto and double-bonded groups is a significant part of the process according to the invention for the production of storage-resistant components according to the invention. Hydrolysis (polycondensation) is thus preferably carried out with respectively one-half of the electrolytically active compound. It can even be advantageous in certain cases if a variable condensation rate is obtained by varying the addition of water to the components.

In order to avoid precipitation as much as possible during hydrolysis and polycondensation, in particular when various hydrolyzable silicon compounds are used, it is preferred in such cases that water be added in several stages, for example, in three stages. Thus, one-tenth to one-twentieth, for example, of the quantity of water stoichiometrically required for hydrolysis is added in the first stage. After brief stirring, one-fifth to one-tenth of the stoichiometric quantity of water is added, and after further brief stirring, finally a stoichiometric quantity of water is added so that a slight excess of water is present at the end. The condensation time depends on the type and percentage of the respective starting components, the optionally used catalyst, the reaction temperature, etc. The polycondensation is generally carried out at standard pressure, but can also be carried out at elevated or reduced pressure.

2. Use of the Coating According to the Invention

The coating according to the invention can be used for image carriers or toner transfer drums. Also possible is a coating comprising other plastics that are intended to have a defined surface charge. For said coating, the lacquer, obtained by mixing the individual components either as such or after partial or essentially total removal of the solvent used or the solvent formed during the reaction, is used in the coating method according to the invention. In some cases it can be advantageous to replace the excess water, and the solvent that is formed and optionally used, in the components obtained after polycondensation with another solvent in order to stabilize said lacquer. To this end, the components can be concentrated, for example under vacuum at a slightly elevated temperature (up to 80° C. maximum) to the point that said components can easily be taken up with another solvent. Acetic ester and toluene in particular have proven to be satisfactory replacement solvents. Such stabilized lacquers are then stable for several weeks without optical changes or a noticeable increase in viscosity.

Radiation with UV light has proven to be satisfactory for curing the lacquer after application onto the image carrier or the toner transfer drum. Surprisingly, it was determined that the presence of a photoinitiator is not required for UV curing of the lacquer produced according to the invention.

The lacquer produced as described above according to the invention is applied to toner transfer drums composed of every conceivable plastic. In order to assure superior adhesion of the overlayer to the plastic substrate, it is generally recommended that the time between drying of the OPC layer and application of said lacquer be kept as short as possible. Otherwise, before coating, said plastic substrate can be subjected to surface treatment such as leaching, coating with primer, corona discharge treatment, etc. Before curing, the solvent is preferably removed from the applied lacquer by evaporation. Curing can then be performed by radiation, using for example a UV emitter, laser, etc., in a generally known manner. For coating it can be advantageous, after the radiation curing, to carry out thermal post-curing using hot water, in particular to remove any existing excess of unsaturated groups or solvent still present.

Using the method according to the invention, layer thicknesses of 3 to 50 µm, in particular 2 to 6 µm, are generally achieved for image carriers or toner transfer drums. It is understood that the method according to the invention is not limited to the application of only a single lacquer layer, but rather it is possible, after application and optional curing of a layer, to apply additional layers, thus obtaining multi-layer structures. It is even possible to regenerate worn-out layers. The coating method according to the invention or the lacquer according to the invention leads in particular to the following unexpected advantages:

Highly scratch-resistant coatings that adhere well to the plastic substrate can be obtained that show no increase in the residual potential after exposure. In particular, for substrates having low thermal load capacity, UV treatment under mild conditions can achieve satisfactory curing in a brief time. Depending on the efficiency of the emitter, UV curing can be carried out in less than 60 seconds.

The following examples describe the present invention and should not be considered limiting in any manner, they are for exemplary purposes only.

A. EXAMPLE 1

A mixture of 102 g acetic ethyl ester, 51 g butyl acetate, and 51 g butoxyethanol was prepared as the solvent. Into this mixture were weighed out 0.2 mol (38.06 g) vinyl triethoxysilane (VTEO), 0.2 mol (39.3 g) mercaptopropyltrimethoxysilane (MTMO), and 0.015 mol (12.4 g of a 60% solution in methanol) octadecyldimethyl(3-trimethoxysilylpropyl) ammonium chloride (ODDMA) and reacted at 15° to 20° C. with 1.2 mol (21.6 g) water. During the course of the reaction, the mixture remained initially turbid after dropwise addition of said quantity of water. To this charge was then added 0.7 g citric acid monohydrate, whereupon said charge turned clear.

The reaction was completed by stirring the reaction mixture for 6 hours at room temperature. The coating solution thus obtained was applied as a third layer onto a toner transfer drum. This can be accomplished by spray coating.

This element, which acts as a photoconductor, comprised a cylindrical aluminum substrate having a diameter of 30 mm and a length of 360 mm, and a coating consisting of an approximately 1 µm-thick generator layer and an approximately 24 µm-thick transport layer. Said generator layer contained a phthalocyanine pigment dispersed in a polyvinylbutyral binder. Said transport layer comprised a compound consisting of equal portions of a hole transport material (N,N'-bis(3-methylphenyl)-N,N'-diphenyl-(1,1'-biphenyl-4,4'-diamine) and a bisphenol Z polycarbonate binder.

The lacquer, which was applied and dried on at room temperature, was cured in a rotating UV oven (by Silberberger, for example) within approximately 120 seconds, whereby the rotary table speed was 12 to 13 rpm. The total radiant power hereby applied to the layer should not exceed approximately 4 J/cm$^2$.

The photoconductor drum provided with this protective layer was used in a conventional printer that was charged by means of a charging roller, laser diode exposure to create the latent charge image, development with a magnetic brush to create the toner image, electrostatic transfer of said toner image to the paper, and cleaning of said photoconductor drum with a scraper. Whereas said photoconductor drum did not have a protective layer (after a print test of 20,000 prints, a decrease of approximately 5 µm in the layer density was observed), for the drum, which was provided with a protective layer, no measurable decrease in the layer density was detected. The print quality was superior in the long-term print test. Homogeneity of the graytone, faultless black and white printing, high resolution capability, and a constant residual potential were not influenced by the protective layer, and were maintained in said long-term print test. In particular, in a print test at elevated air moisture (22° C., 80% relative humidity), no change in the print quality was observed.

B. EXAMPLE 2

A mixture of 75 g toluene, 75 g butyl acetate, and 75 g butoxyethanol was prepared as the solvent. Into this mixture were weighed out 0.34 mol (50.4 g) vinyl trimethoxysilane (VTMO), 0.17 mol (33.4 g) mercaptopropyltrimethoxysilane, and 0.03 mol (24.8 g of a 60% solution in methanol) octadecyldimethyl(3-trimethoxysilylpropyl) ammonium chloride (ODDMA) and reacted at 15° to 20° C. with 1.9 mol water in the form of 0.1 N hydrochloric acid (35 g).

The reaction was completed by stirring the reaction mixture for 6 hours at room temperature. During the course of the further reaction, the mixture, which initially remained turbid after dropwise addition of said quantity of water, turned clear. After addition of 0.4% camphorquinone, the coating solution thus obtained was applied as a third layer onto a toner transfer drum. This can be accomplished by flow coating, whereby said coating solution is poured onto the substrate by means of a large-gauge nozzle. This substrate comprised a cylindrical alauninum substrate having a diameter of 30 mm and a length of 360 mm, and a coating consisting of an approximately 1 µm-thick generator layer and an approximately 24 µm-thick transport layer. Said generator layer contained a phthalocyanine pigment dispersed in a polyvinylbutyral binder. Said transport layer comprised a compound consisting of equal portions of a hole transport material and a bisphenol Z polycarbonate binder.

Said hole transport material comprised 70% 4-dibenzylamino-2-methylbenzaldehyde-N,N-diphenylhydrazones and 30% 1,1-bis(p-diethylaminophenyl)-4,4-diphenyl-1,3-butadienes.

For curing, the dried-on layer was cured within approximately 180 seconds in front of a lamp irradiating short-wave light (300 to 400 nm wavelength), whereby the surface power was markedly lower than in Example 1. The photoconductor drum provided with the protective layer was used in a conventional printer that was charged by means of a charging roller, laser diode exposure to create the latent charge image, development with a magnetic brush to create the toner image, electrostatic transfer of the toner image to the paper, and cleaning of said photoconductor drum with a scraper. Whereas said photoconductor drum did not have a protective layer (after a print test of 20,000 prints, a decrease of approximately 5 µm in the layer density was observed), for the drum, which was provided with a protective layer, no measurable decrease in the layer density was detected.

The print quality was superior in the long-term print test. Homogeneity of the graytone, faultless black and white printing, high resolution capability, and a constant residual potential were not influenced by the protective layer, and were maintained in said long-term print test. In particular, in a print test at elevated air moisture (22° C., 80% relative humidity), no change in the print quality was observed.

C. EXAMPLE 3

A mixture of 102 g acetic ethyl ester, 51 g butyl acetate, and 51 g butoxyethanol was prepared as the solvent. Into this mixture were weighed out 0.1 mol (24.6 g) aluminum triisobutylate, 0.17 mol (25.2 g) vinyl trimethoxysilane (VTMO), 0.17 mol (30.65 g) mercaptopropylmethyldiethoxysilane (MPMDO), and 0.02 mol (16.6 g of a 60% solution in methanol) octadecyldimethyl(3-trimethoxysilylpropyl)ammonium chloride (ODDMA) and reacted at 15° to 20° C. with 1.7 mol (30.6 g) water. During the course of the reaction, the mixture gradually turned clear after dropwise addition of said quantity of water.

The reaction was completed by stirring the reaction mixture for 6 hours at room temperature. The coating solution thus obtained was applied as a second layer onto a toner transfer drum. This was accomplished by spray coating, whereby the substrate was a cylindrical aluminum substrate having a diameter of 30 mm and a length of 254 mm, with an approximately 24 μm-thick photoconductive coating.

The latter comprised 1% phthalocyanine pigment, 59% bisphenol Z polycarbonate binder, 30% hole transport material composed of (N,N'-bis(3-methylphenyl)-N,N-diphenyl (1,1'-biphenyl-4,4'-diamine), a nd 10% electron conductor (1,3-bis(dicyanomethylene)-2-allyl-2-methylindane).

The coating was predried at 80° C. for 10 min, and was organically crosslinked by rotating UV radiation at approximately 3 J/cm$^2$.

The photoconductor drum provided with this protective layer was used in a conventional printer that was charged by means of a charging roller, laser diode exposure to create the latent charge image, development with a magnetic brush to create the toner image, electrostatic transfer of the toner image to the paper, and cleaning of said photoconductor drum with a scraper. Whereas said photoconductor drum did not have a protective layer (after a print test of 20,000 prints, a decrease of approximately 5 μm in the layer density was observed), for the drum, which was provided with a protective layer, no measurable decrease in the layer density was detected. The print quality was superior in the long-term print test. Homogeneity of the graytone, faultless black and white printing, high resolution capability, and a constant residual potential were not influenced by the protective layer, and were maintained in said long-term print test. In particular, in a print test at elevated air moisture (22° C., 80% relative humidity), no change in the print quality was observed.

What is claimed is:

1. A toner transfer drum having a coating, said coating comprising:

at least one hydrolyzable silicon compound of the general formula $$SiX_nR_{(4-n)} \qquad (I)$$

wherein the groups X, which can be the same or different, in particular are selected from the group comprising alkoxy, hydroxy, halogen, aryloxy, and acyloxy groups; wherein the groups R, which can be the same or different, can be selected from the group comprising alkyl, alkenyl, alkynyl, and aryl groups, wherein said groups can optionally have one or several substituents that are inert under the reaction conditions, and the aforementioned alkyl groups include cyclic aryl substituted groups, and the alkenyl and alkynyl groups can likewise be cyclic, an said aryl groups can also include alkaryl groups, wherein the mercapto groups present in the compound are preferably located on said alkyl and aryl groups, wherein in said formula, R is selected from alkyl, alkenyl, and alkynyl groups; and wherein the mixture additionally comprises one or several hydrolytically condensable compounds of silicon or other elements from the group comprising B, Al, P, Sn, Pb, the transition metals, lanthanides, and actinides, wherein at least one of the monomeric compounds used for the condensation is derived from a silicon compound of the general formula $$Z_aSiY_bR_{(4-a-b)} \qquad (II)$$

wherein the groups and subscripts are the different and have the following meanings:

Y=hydrogen, halogen, hydroxy, optionally substituted alkoxy, acyloxy, alkylcarbonyl, alkoxycarbonyl, or NR'$_2$;

Z=quaternary ammonium salts derived from R$^2_2$N—(R$^3$—NR$^2$—)$_k$—R$^3$, or
Z=1/mA$^{mS}$R$^2_2$N$^r$—R$^3$—, 1/mA$^{mS}$(HO—R$^3$)$_2$N$^r$—R$^3$—, 1/mA$^{mS}$(R$^2$O)$_2$P$^r$(O)—R$^3$—, 1/mA$^{mS}$(R$^2_2$N)$_2$C—S$^r$—R$^3$, 3/nK$^{nr}$(OOC$^S$)$_2$—N—R$^3$—N(COO$^S$)—R$^3$—, 1/mA$^{mS}$H$_2$C═C—(R$^2$)—R$^3$N'(R$^2_2$)—R$^3$—, 1/mA$^{mS}$(H$_2$C═C—R$^2$)—CO—O—R$^3$N'(R$^2_2$)—R$^3$—;

R=optionally substituted alkyl, alkenyl, aryl, alkylaryl, or arylalkyl;

R$^1$=hydrogen, alkyl, or aryl;

R$^2$=hydrogen, optionally substituted alkyl, alkenyl, aryl, alkylaryl, or arylalkyl;

R$^3$=optionally substituted alkylene, alkenyl, or arylene;

A$^{mS}$=anion with a valence of m;

K$^{nr}$=cation with a valence of n;

a=1, 2, or 3;

b=1, 2, or 3;

a+b=2, 3, or 4; and k=0, 1, 2, or 3.

2. The toner transfer drum having a coating according to claim 1, wherein the mixture comprises at least one hydrolyzable silicon compound of the formula $$SiX_nR_{(4-n)} \qquad (I),$$

wherein at least one of the groups R is a mercapto-substituted alkyl or aryl group.

3. The toner transfer drum having a coating according to claim 2, wherein said coating is producible by hydrolysis of a mixture comprising at least one compound of the formula $$SiX_nR_{(4-n)} \qquad (I),$$

wherein at least one of the groups X is an alkoxy group.

4. The toner transfer drum having a coating according to claim 2, wherein said coating is producible by hydrolysis of a mixture comprising at least one compound of the formula $$SiX_nR_{(4-n)} \qquad (I),$$

wherein at least one of the groups R is an alkenyl group.

5. The toner transfer drum having a coating according to claim 1, wherein said coating is producible by hydrolysis of a mixture comprising at least two compounds of the formula $$SiX_nR_{(4-n)} \qquad (I)$$

and at least one compound of the formula $$Z_aSiY_bR_{(4-a-b)}. \qquad (II)$$

6. The toner transfer drum having a coating according to claim 5, wherein said coating is producible by hydrolysis of a mixture comprising at least one compound of the formula $$Z_aSiY_bR_{(4-a-b)} \qquad (II),$$

wherein at least one of the groups Y is an alkoxy group.

7. The toner transfer drum having a coating according to claim 5, wherein said coating is producible by hydrolysis of a mixture comprising at least one compound of the formula $$Z_aSiY_bR_{(4-a-b)} \qquad (II),$$

wherein at least one of the groups Z contains a quaternary ammonium group in which at least one of the substituents on the nitrogen is an alkyl group.

8. The toner transfer drum having a coating according to claim 5, wherein said coating is producible by hydrolysis of a mixture comprising at least one compound of the formula $$Z_aSiY_bR_{(4-a-b)} \qquad (II)$$

wherein at least one of the groups Z contains a quaternary ammonium group in which at least one of the substituents on the nitrogen is long-chain aliphatic group.

9. The toner transfer drum having a coating according to claim 1, wherein said coating is producible by hydrolytic condensation proceeding from a mixture comprising at least one hydrolyzable zirconium and/or aluminum compound in a maximum quantity of 30 mole percent relative to the total quantity of silicon, zirconium, and aluminum compounds.

10. The toner transfer drum having a coating according to claim 9, wherein said coating is producible by hydrolytic condensation proceeding from a mixture comprising at least one hydrolyzable silicon compound and/or zirconium compound and/or aluminum compound, whereby 1 to 40 percent of all groups bound to the aforementioned elements are non-hydrolyzable groups having an ethylenically unsaturated bond, and in addition, said non-hydrolyzable groups are substituted on the aforementioned elements, of which at least one of said groups contains mercapto group, namely in such quantities that the ratio of ethylenically unsaturated bonds to mercapto groups in or on non-hydrolyzable groups is between 25:1 and 1:1.

11. The toner transfer drum having a coating according to claim 1, wherein said coating is produced by hydrolytically condensation and cured by irradiation.

12. The toner transfer drum according to claim 11, wherein the coating is produced by alternatively or additionally carrying out thermal curing.

13. The toner transfer drum according to claim 11, wherein at least one of the compounds named in claims 1 through 10 is totally or partially used in the form of a precondensate.

14. The toner transfer drum according to claim 11, wherein an oligomer that is soluble in the reaction medium in the form of a straight-chain or cyclic, low-molecular weight partial condensate having a condensation rate of preferably approximately 2 to 100, particularly preferably between 2 and 6, is used as a precondensate.

15. The toner transfer drum according to claim 11, wherein the hydrolytic condensation is carried out in the presence of at least one silicon compound to be hydrolyzed by reaction with water, whereby said silicon compound can be present as such, or dissolved in a suitable solvent.

16. The toner transfer drum according to claim 11, wherein the hydrolytic condensation is carried out in the presence of at least one reactive compound of zirconium and/or aluminum by the stepwise addition of water.

17. The toner transfer drum according to claim 11, wherein the compounds are hydrolyzed at a temperature between −20° and 130° C., preferably between 0° and 30° C. or the boiling point of the optionally used solvent.

18. The method for producing a toner transfer drum having a coating, comprising first applying a generator layer onto a cylindrical substrate then applying a transport layer thereon, and then applying an electrically conductive coating as a third layer, said coating comprising at least one hydrolyzable silicon compound of the general formula $$SiX_nR_{(4-n)} \qquad (I)$$

wherein the groups X, which can be the same or different, in particular are selected from the group comprising alkoxy, hydroxy, halogen, aryloxy, and acyloxy groups; wherein the groups R, which can be the same or different, can be selected from the group comprising alkyl, alkenyl, alkynyl, and aryl groups, wherein said groups can optionally have one or several substituents that are inert under the reaction conditions, and the aforementioned alkyl groups include cyclic aryl substituted groups, and the alkenyl and alkynyl groups can likewise be cyclic, an said aryl groups can also include alkaryl groups, wherein the mercapto groups present in the compound are preferably located on said alkyl and aryl groups, wherein in said formula, R is selected from alkyl, alkenyl, and alkynyl groups; and wherein the mixture additionally comprises one or several hydrolytically condensable compounds of silicon or other elements from the group comprising B, Al, P, Sn, Pb, the transition metals, lanthanides, and actinides, wherein at least one of the monomeric compounds used for the condensation is derived from a silicon compound of the general formula $$Z_aSiY_bR_{(4-a-b)} \qquad (II)$$

wherein the groups and subscripts are the different and have the following meanings:

Y=hydrogen, halogen, hydroxy, optionally substituted alkoxy, acyloxy, alkylcarbonyl, alkoxycarbonyl, or NR'$_2$;

Z=quaternary ammonium salts derived from R$^2_2$N—(R$^3$—NR$^2$—)$_k$—R$^3$, or

Z=1/mA$^{mS}$R$^2_2$—N$^r$—R$^3$—, 1/mA$^{mS}$(HO—R$^3$)$_2$—N$^r$—R$^3$—, 1/mA$^{mS}$(R$^2$O)$_2$P$^r$(O)—R$^3$—, 1/mA$^{mS}$(R$^2_2$N)$_2$C—S$^r$—R$^3$, 3/nK$^{nr}$(OOC$^S$)$_2$—N—R$^3$—N(COO$^S$)—R$^3$—, 1/mA$^{mS}$H$_2$C=C—(R$^2$)—R$^3$N$^r$(R$^2_2$)—R$^3$—, 1/mA$^{mS}$(H$_2$C=C—R$^2$)—CO—C—R$^3$N$^r$(R$^2_2$)—R$^3$—;

R=optionally substituted alkyl, alkenyl, aryl, alkylaryl, or arylalkyl;

R$^1$=hydrogen, alkyl, or aryl;

R$^2$=hydrogen, optionally substituted alkyl, alkenyl, aryl, alkylaryl, or arylalkyl;

R$^3$=optionally substituted alkylene, alkenyl, or arylene;

A$^{mS}$=anion with a valence of m;

K$^{nr}$=cation with a valence of n;

a=1, 2, or 3;
b=1, 2, or 3;
a+b=2, 3, or 4; and
k=0, 1, 2, or 3.

19. The method according to claim 18, wherein the coating is produced by alternatively or additionally carrying out thermal curing.

20. The method according to claim 18, wherein at least one of the compounds is totally or partially used in the form of a precondensate.

21. The method according to claim 18, wherein an oligomer that is soluble in the reaction medium in the form of a straight-chain or cyclic, low-molecular weight partial condensate having a condensation rate of preferably approximately 2 to 100, particularly preferably between 2 and 6, is used as a precondensate.

22. The method according to claim 18, wherein the hydrolytic condensation is carried out in the presence of at least one silicon compound to be hydrolyzed by reaction with water, whereby said silicon compound can be present as such, or dissolved in a suitable solvent.

23. The method according to claim 18, wherein the hydrolytic condensation is carried out in the presence of at least one reactive compound of zirconium and/or aluminum by the stepwise addition of water.

24. The method according to claim 18, wherein the compounds are hydrolyzed at a temperature between −20° and 130° C., preferably between 0° and 30° C. or the boiling point of the optionally used solvent.

* * * * *